United States Patent [19]

Pascarella et al.

[11] 3,962,077
[45] June 8, 1976

[54] PROCESS FOR THE PURIFICATION OF WASTE WATERS

[75] Inventors: Giorgio Pascarella, Pesaro; Francesco Salvemini, Fano, both of Italy

[73] Assignee: Tecneco S.p.A., Fano (Pesaro), Italy

[22] Filed: June 14, 1974

[21] Appl. No.: 479,558

[30] Foreign Application Priority Data
June 15, 1973 Italy .................................. 25392/73

[52] U.S. Cl. ............................. 210/23 H; 127/46 A; 127/46 R; 204/138; 210/39
[51] Int. Cl.² ........................................ B01D 13/00
[58] Field of Search ............... 204/138; 127/46 R, 9, 127/46 A; 210/22, 23, 259, 24, 39

[56] References Cited
UNITED STATES PATENTS

| | | | |
|---|---|---|---|
| 3,268,441 | 8/1966 | Lindstrom | 210/22 |
| 3,639,231 | 1/1972 | Bresler | 210/259 X |
| 3,781,174 | 12/1973 | Nishijima et al. | 127/46 A |
| 3,791,866 | 2/1974 | Konin et al. | 127/46 A |
| 3,823,086 | 7/1974 | Schmidt | 210/259 X |

*Primary Examiner*—Frank A. Spear, Jr.
*Attorney, Agent, or Firm*—Ralph M. Watson

[57] ABSTRACT

The present invention concerns a method for purifying waste waters which come from the regeneration of the anionic and cationic resins used in the treatment of sugar juices. The method includes subjecting the waste waters to one or more zones which include an inverse osmosis section and one or more electrolysis cells.

5 Claims, 1 Drawing Figure

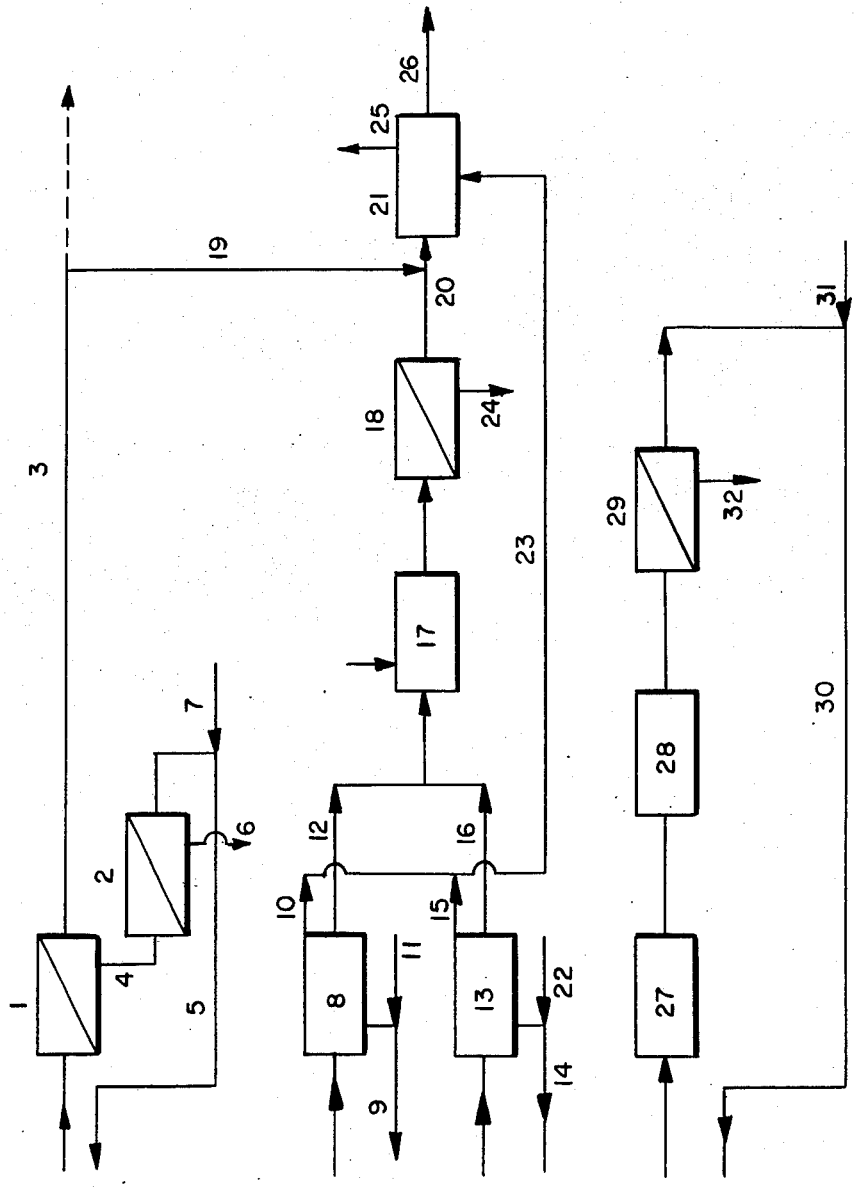
FIG. I

PROCESS FOR THE PURIFICATION OF WASTE WATERS

The present invention relates to a process for the purification of waste waters containing organic and inorganic products which may or may not be ionizable and is particularly advantageous when the recovery and/or recycle of the wastes represents a factor of economical interest as to the treatment of said waters.

It is possible in fact to recover and recycle, with economical advantages, good percentages of the acids and bases, normally used without recovery, and high purity waters and organic products having a high nourishing value can be extracted.

More particularly the present invention relates to a purification process, essentially based on the use of electrolysis by means of cells having ion-selective membranes, applicable to all wastes containing organic and inorganic products, ionizable and not ionizable, except for however colloidal substances capable to react with the ion-selective membranes.

Even though the process of the present invention is absolutely general, for the sake of a better exemplification of the invention itself, we shall describe the invention hereinafter by referring to the purification of waters coming from the regeneration treatments of the resins used for demineralizing and decolorization of the sugar juices in the sugar industry.

It is obvious, however, that the scope of the present invention must not be supposed to be limited to what we shall hereinafter state; it will be in fact easy, for a person skilled in the art, to apply the principles of the invention to the purification of waters of different origin, by bringing obvious modifications without leaving the scope of the same.

It is known that the use of resins in the sugar industry permits one to obtain high purity products which are therefore competitive on the market. This is achieved by minimizing the sugar losses in the form of molasses which normally form without the use of ion-exchange resins for obtaining sugar having analogous qualities.

The resins which are used can be distinguished as anionic and cationic (strong and weak) according to whether their use consists in "binding" anions and cations of different ionic "strength".

In the sugar industry the uses of such resins can be summarized as follows:

1. decalcification of the process waters by means of cationic resins regenerated by means of sodium chloride
2. demineralizing, and slight decolorization, of the diluted juices by means of cationic resins, regenerated, in general, with ammonium or sodium hydroxide
3. demineralizing, and slight decolorization, of the diluted juices by means of anionic resins regenerated with hydrochloric acid or, more often, sulphuric acid
4. total decolorization of the juices by means of macroporous resins capable of fixing the non-ionizable organic substances contained in the sugar mill waters and to which they give a more or less live colour. The regeneration is effected with sodium chloride.

The waters coming from the regeneration treatments of the resins present a high content of either salts or acids or bases and a remarkable amount of organic substances such as group B vitamines, simple proteins (such as lysine, arginine, tyrosine), more complex compounds (such as betaine, glutamic acid, aspartic acid) and a fraction of sugars.

The global volume of the wastes is very high (for a medium — big industry there are from 2000 to 3000 $m^3$/day for about 100 working days) and brings forth remarkable problems for its discharge since its organic content which can ferment and its saline content obviously do not permit it to be sent to open basins.

It is impossible also to send said wastes to sewers above all because of their polluting content but also because in almost all cases the location of a sugar mill is somewhat far from highly crowded zones or from high industrial density zones.

The methods heretofore used for solving the problem have not given satisfactory results. The biological treatment has been unsatisfactory both because of the low obtained yields and because of the complication due to the necessity of starting the plant with synthetic waters before the start of the production period; The chemical treatment is also unsatisfactory since the clear appearance of the waste waters due to the very low content of colloids, does not permit the use of coagulants for the flocculation. Other methods have been proposed, among which are: 1) the lagooning which presents drawbacks due to the uneconomical utilization of a large ground area and to the development of disagreeable smells, 2) the inverse osmosis which does not allow a strong separation of the organic compounds from the salts in the polluting waste waters having a reduced volume obtained after the treatment, 3) and finally the electrodialysis which presents the drawback of the high cost and of the difficulty in separating the organic compounds from amino acids which migrate toward the electrodes with a high speed.

The purification process according to the present invention yields a complete purification of the waste waters with relatively low costs, if one considers also the possibility of recycle or recovery.

The treatment of the waters coming from the regeneration of the resins of a sugar mill according to the process of the present invention allows moreover the obtaining of the following results:

a. a saline and organic content of the obtained waters such as to make said waters acceptable not only for the discharge into surface waters, but also suitable to be used again in the process with obvious advantages as to the depauperation of the water-bearing stratum;

b. a recovery with high efficiency of sodium chloride which has been used and which is recycled to the regeneration stages (decolouring and decalcifying resins) with possible economical advantage of transport and storing;

c. a recovery, at the requested concentration, of the acids and bases used for the regeneration of respectively the anionic and cationic resins. Also in this case the advantage can be remarkable if one considers the high consumptions of these reagents in the sugar industry;

d. almost complete recovery of the organic substances contained in these waters which substances, being constituted by amino acids, purine and pyrimidine bases as well as by vitamins (even if in small amount) and oligodynamic elements, can find wide use as fodder integrative material for the nourishiment of the cattle in zootechnical breedings;

e. recovery for a worthier utilization of the lands now used for lagooning and elimination of the developed odours and of possible infiltration in the water-bearing stratums;

f. utilization of a system which can begin at the start of the production period, without pre-conditioning and is easily controllable during working.

The process is exemplified in the scheme reported in FIG. 1.

It comprises the following steps:

The waters, coming from the regeneration of the decolouring resins, rich in sodium chloride and containing organic substances are introduced into an inverse osmosis section consisting of two stages (1 and 2) from the first of which, through 3, we obtain a solution concentrated in organic substances having a low NaCl content and, through 4) a diluted NaCl solution free from organic substances. In the second stage there is effected the concentration of sodium chloride up to the desired values recycling the same through 5 to the resins and the separation of practically deionized water (6). Through 7 the solution recycled to the resins is restored.

The waters coming from the regeneration of the anionic resins (containing ammonium hydroxide and organic substances) are fed to the anodic compartment of an electrolytic cell (8) having two compartments and a cation-selective septum and there subjected to electrolysis in order to obtain in the cathodic compartment ammonium hydroxide at the concentration requested for being recycled through 9 to the regeneration and hydrogen 10.

11 indicates the make-up to the recycle. A diluted organic solution leaves the anodic compartment, through 12, and is further demineralized up to the desired value by coupling, in function of the consequent progressive pH variation, a cell having cationselective septums to another cell having anion-selective septums.

For the waters coming from the regeneration of the cationic resins the treatment is analogous, the only difference being that said waters are fed to the cathodic compartment of an electrolytic cell (13) having two compartments with anion-selective membranes obtaining sulphuric acid at the concentration necessary for the recycle (14), oxygen (15) and a diluted solution of the organic substances (16). 22 indicates the make-up. The deionization limit depends on the possible sequence of anion-selective and cation-selective membranes, analogously to what foreseen in the foregoing point.

The "organic" waters, if not completely demineralized, pass to a neutralization and mixing stage (17) from which they are sent to a inverse osmosis treatment (18). In this way there are obtained concentrated "organic" waters which, mixed with the ones coming, through 19, from the osmotic processes of the waters from the decolouring resins, are fed, through 20, to an evaporator (21) for recovering the dry organic substance, exploiting, as not polluting fuel, the hydrogen produced in the electrolytic cells for the anionic waters, possibly with addition of methane, fed to 21 through 23. Purified water is discharged through 24; 25 is the vent for steam and, through 26, the organic products are recovered.

The waters coming from the regeneration of decalcifying resins are sent to a treatment stage (27) wherein magnesium is precipitated in the form of hydroxide by adding sodium hydroxide and calcium is precipitated by addition of carbon dioxide, possibly recovered from the lime furnaces present in the plant. A neutralization phase (28) with hydrochloric acid and at last a inverse osmosis treatment (29) for the concentration of the solution to the values requested for the recycle to the resins, through 30, follow.

31 indicates the make-up. At the same time high purity water (32) is obtained. Alternatively the organic effluent stream, containing sodium chloride, leaving the first stage of the osmosis treatment of the waters from the regeneration of the decolouring resins, can be sent to a roasting furnace wherefrom the sodium chloride to be recycled is recovered.

The nature of the ion-selective membranes is not important for an exact understanding of the process according to the present invention since they can be selected by the technician according to the problem to be solved.

It is moreover to be taken into account that the ion-selective cells can be used also more than once, as clearly is evident also from the following example, with which we intend to give a better view of the operative conditions of the process according to the invention without limiting in any case the same.

EXAMPLE a. Regeneration waters coming from the cycle of the decolouring resins:

A treatment was carried out by feeding to a inverse osmosis pilot plant 1 $m^3$ of waters coming from the regeneration of the decolouring resins, containing, as indicated by the analysis, 37 kg of NaCl and 9 kg of organic compounds. From the first stage of a multi-stage plant we obtained a concentrated effluent stream (volume = 0.27 $m^3$) containing 24.1 kg of NaCl and 8.7 kg of organic substances and a diluted stream (volume = 0.73 $m^3$) containing 12.9 kg of NaCl and 0.32 kg of organic substances.

The diluted solution was sent to a second stage wherefrom we obtained a concentrated solution (volume = 0.36 $cm^3$) containing all NaCl and organic substances and a diluted solution (volume = 0.37 $m^3$) of fresh water. The concentrated solution referred to above, fed to a roasting furnace, gave pure sodium chloride by combustion of the organic residue.

b. Waters from the regeneration of the cationic resins: A treatment was carried out by feeding 1 $m^3$ of the stream from the regeneration of the cationic resins to a pilot plant consisting of three stages constituted by electrolytic cells the first two of which are divided in two compartments by anionic membranes while the third was divided in two compartments by a cationic membrane.

The composition of feed was: 25 kg of free $H_2SO_4$, 6.3 kg of inorganic not sugary substances (free bases), 16.9 kg of not sugary organic substances. From the first stage we obtained 15 kg of pure $H_2SO_4$ at a concentration, in water, of about 20% which could be recycled directly to the regeneration of the resins; from the second stage we obtained 10 kg of $H_2SO_4$ impure for organic substances at a concentration also it of about 20%; from the third stage we recovered an alkaline solution of the cations present in the starting solution and a deionized solution of not sugary organic substances for a total amount of 16.9 kg.

The three stages could be carried out up to the desired deionization limit according to the desired demands and economy.

c. waters from the regeneration of anionic resins: A treatment analogous to the one of the preceding point was carried out by feeding 1 m³ of waters coming from the regeneration of anionic resins to an electrolysis pilot plant having three stages, as precedingly described, wherein in the first two stages cationic membranes and in the last stage an anionic membrane were present.

The composition of the effluent stream was the following:

10.6 kg of ammonia (in the form of $NH_4OH$ 100%); 4.1 kg of anions; 10 kg of not ionizable organic substances.

From the first stage we recovered a solution of ammonium hydroxide at the requested concentration (kg 7.1); from the second stage 3.5 kg of ammonium hydroxide impure for organic ionizable substances and at last from the third stage a solution of anions (in general sulphuric acid, hydrochloric acid, nitric acid) (4.1 kg) and a deionized solution of not sugary organic substances.

d. Mixture of the waters containing organic compounds from the electrolysis of points b) and c):

1 m³ of waters, obtained by mixing the effluent streams containing organic compounds coming from the two electrolisis treatments with ion-selective membranes and containing about 14 kg of not ionizable organic substances, was fed to an inverse osmosis pilot plant provided with suitable membranes obtaining from one side high purity water (0.9 m³) and from the other side 0.1 m³ containing 14 kg of organic substances to be fed to an evaporation treatment for recovering the same as dry residue.

In practice for 1 m³ of effluent stream sent to the two electrolytic treatments 12 m³ of hydrogen were produced which permitted the evaporation of about 50 kg of water at 100°C.

e. waters from the regeneration of the decalcifying resins:

1 m³ of waters coming from the regeneration of the decalcifying resins contained 53.8 kg of NaCl, 9.42 kg of $CaCl_2$ and 2.2 kg of $MgCl_2$.

The treatment was effected by regulating the pH with sodium hydroxide obtaining the insolubilization of magnesium hydroxide (8.9 kg of added NaOH) and adding $CO_2$ (~4 kg in the form $CO_2$) obtaining the insolubilization of present lime in the form of $CaCO_3$.

From the treatment, after filtration, waters were obtained that, apart from soluble magnesium hydroxide and calcium carbonate, contained 53.8 kg of starting NaCl and 13 kg of Na Cl deriving from the neutralization of the used sodium hydroxide with HCl.

This solution could be concentrated by osmosis obtaining a solution of about 120 – 130 kg/m³ which could be recycled to the regeneration of the resins.

What we claim is:

1. A process for the purification of waste waters containing organic and inorganic products which may or may not be ionizable, said waste waters characterized as coming from the regeneration of the anionic and cationic demineralizing resins, the decoloring resins, and the decalcifying resins used for the treatment of the sugar juices in the sugar industry, said process comprising the following steps:
    A. feeding said waste waters coming from the regeneration of the decoloring resins to an inverse osmosis section consisting of two stages;
    B. feeding waste waters which come from the regeneration of the anionic demineralizing resins to an anodic compartment of one or more electrolytic cells each having two compartments and subjecting said water therein to electrolysis;
    C. feeding waters which come from the regeneration of the cationic demineralizing resins to a cathodic compartment of one or more electrolytic cells each having two compartments and subjecting said water therein to electrolysis;
    D. feeding waters coming from the regeneration of decalcifying resins to a precipitation treatment with sodium hydroxide, and carbon dioxide, subsequently neutralizing said waters and subjecting them to a final inverse osmosis treatment;
    E. mixing and neutralizing the treated waters rich in organic materials from steps B and C hereinabove, where they are not completely demineralized, and then subjecting the waters to an inverse osmosis treatment and thereafter mixing them with treated solution rich in organic substances from step A; and
    F. feeding treated waters from step E containing organic compounds (organic waters), after having been mixed together, to an evaporator for recovering the dry organic substance.

2. The process of claim 1 wherein the waters coming from the regeneration of the decoloring resins are rich in sodium chloride and organic substances.

3. The process of claim 1, step A, wherein
    the first stage of the inverse osmosis section yields (i) a solution concentrated in organic substances having a low sodium chloride content and (ii) a diluted sodium chloride solution free from organic substances; and
    the second stage yields practically deionized water by concentration of the sodium chloride solution (ii).

4. A process for the purification of waste waters from the regeneration of the decoloring resins according to claim 3 characterized in that the organic effluent stream (ii) containing sodium chloride is fed to a roasting furnace for recovering the sodium chloride.

5. The process of claim 1 wherein the waters coming from the regeneration of the anionic demineralizing resins contain ammonium hydroxide and organic substances.

* * * * *